(12) United States Patent
Wang et al.

(10) Patent No.: US 11,418,948 B2
(45) Date of Patent: Aug. 16, 2022

(54) METHOD OF ADAPTIVELY SETTING ACCESS POINT NAME

(71) Applicant: Wistron Corporation, New Taipei (TW)

(72) Inventors: Shih-Ting Wang, New Taipei (TW); Yu-Wei Fan, New Taipei (TW); Cheng-Ying Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/740,469

(22) Filed: Jan. 12, 2020

(65) Prior Publication Data

US 2021/0127259 A1 Apr. 29, 2021

(30) Foreign Application Priority Data

Oct. 24, 2019 (TW) ................... 108138370

(51) Int. Cl.
| | |
|---|---|
| *H04W 8/26* | (2009.01) |
| *H04W 8/08* | (2009.01) |
| *H04W 76/12* | (2018.01) |
| *H04W 48/20* | (2009.01) |
| *H04W 48/16* | (2009.01) |
| *H04W 80/04* | (2009.01) |
| *H04W 12/086* | (2021.01) |

(52) U.S. Cl.
CPC ............. *H04W 8/26* (2013.01); *H04W 8/082* (2013.01); *H04W 48/16* (2013.01); *H04W 48/20* (2013.01); *H04W 76/12* (2018.02); *H04W 80/04* (2013.01); *H04W 12/086* (2021.01)

(58) Field of Classification Search
CPC ....... H04W 8/26; H04W 76/12; H04W 8/082; H04W 48/16; H04W 48/20; H04W 80/04; H04W 84/16; H04W 12/086
USPC ............... 455/329, 328, 338, 341, 345, 350; 370/329, 328, 338, 341, 345, 350
See application file for complete search history.

(56) References Cited

U.S. PATENT DOCUMENTS

| | | | | |
|---|---|---|---|---|
| 8,903,930 | B2 * | 12/2014 | Park ...................... | H04W 8/186 |
| | | | | 709/206 |
| 9,648,515 | B2 | 5/2017 | Velev | |
| 9,955,513 | B2 * | 4/2018 | Kim ...................... | H04W 76/10 |
| 10,455,406 | B2 * | 10/2019 | Baek .................... | H04W 8/005 |
| 10,887,831 | B2 * | 1/2021 | Zhu ...................... | H04W 48/10 |
| 2018/0103366 | A1 * | 4/2018 | Aramoto ................ | H04W 8/20 |

FOREIGN PATENT DOCUMENTS

CN 108886758 A 11/2018

\* cited by examiner

*Primary Examiner* — Nghi H Ly
(74) *Attorney, Agent, or Firm* — Winston Hsu

(57) ABSTRACT

A method of adaptively setting an access point name, APN, for a base station in a wireless communication system, the method comprising: transmitting a broadcast message or an EMM information to a mobile device of the wireless communication system, wherein the broadcast message or the EMM information includes an APN data for the mobile device to establish a packet data network, PDN, connection with a server, such that the mobile device could obtain private network service provided by the server.

8 Claims, 5 Drawing Sheets

METHOD OF ADAPTIVELY SETTING ACCESS POINT NAME

BACKGROUND OF THE INVENTION

1. Field of the Invention

The present invention relates to a method of setting access point name and a related device, and more particularly, to a method of adaptively setting access point name and a related device.

2. Description of the Prior Art

With popularity of mobile devices, most services have been provided through mobile devices. Some types of services provided by small service units (e.g. femtocell) have become personalized and localized (e.g. private networks) due to market requirements. In view of this, communication services of mobile devices need to be improved to provide differentiated service content. Moreover, users may be limited by the choice of tariff plans, so that user sides may not have transmission capabilities or only have limited capabilities.

Conventional application method defined in the communication standard is that the operator sends a set or array of encoded data through the value-added service to a specific mobile device through the subscriber identity module (SIM) interface, to change the access point name, APN, settings for connecting to a private network and obtaining the corresponding services. Another method is to use the terminal management program at the application layer to connect with the control server in the cloud through the TCP/IP protocol, thereby achieving the purpose of APN management and setting. Although the abovementioned two methods can realize the APN control, they cannot timely change the APN to achieve special applications in regional activities (e.g. the user enters a specific area).

SUMMARY OF THE INVENTION

It is therefore an objective to provide a method of adaptively setting access point name and related device to solve the above problem.

The present invention discloses a method of adaptively setting access point name, APN, for a base station of a wireless communication system. The method comprises transmitting a broadcast message or an EPS mobility management information, EMM information, to a mobile device of the wireless communication system, wherein the broadcast message or the EMM information includes an APN data for the mobile device to establish a packet data network, PDN, connectivity corresponding to a server according to the APN data, to obtain a service provided by the server via the PDN connectivity.

The present invention further discloses a method of adaptively setting access point name, APN, for a mobile device of a wireless communication system. The method comprises receiving a broadcast message or an EPS mobility management information, EMM information, from a base station of the wireless communication system, wherein the broadcast message or the EMM information includes an APN data, and establishing a packet data network, PDN, connectivity corresponding to a server according to the APN data, to obtain a service of the server via the PDN connectivity.

The present invention further discloses a base station for adaptively setting access point name, APN. The base station comprises a processing unit, for executing a program code, and a storage unit, coupled to the processing unit, for storing the program code, wherein the program code instructs the processing unit to perform the following steps: transmitting a broadcast message or an EPS mobility management information, EMM information, to a mobile device of the wireless communication system, wherein the broadcast message or the EMM information includes an APN data for the mobile device to establish a packet data network, PDN, connectivity corresponding to a server according to the APN data, to obtain a service provided by the server via the PDN connectivity.

The present invention further discloses a mobile device for adaptively setting access point name, APN. The mobile device comprises a processing unit, for executing a program code, and a storage unit, coupled to the processing unit, for storing the program code, wherein the program code instructs the processing unit to perform the following steps: receiving a broadcast message or an EPS mobility management information, EMM information, from a base station of the wireless communication system, wherein the broadcast message or the EMM information includes an APN data, and establishing a packet data network, PDN, connectivity corresponding to a server according to the APN data, to obtain a service of the server via the PDN connectivity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
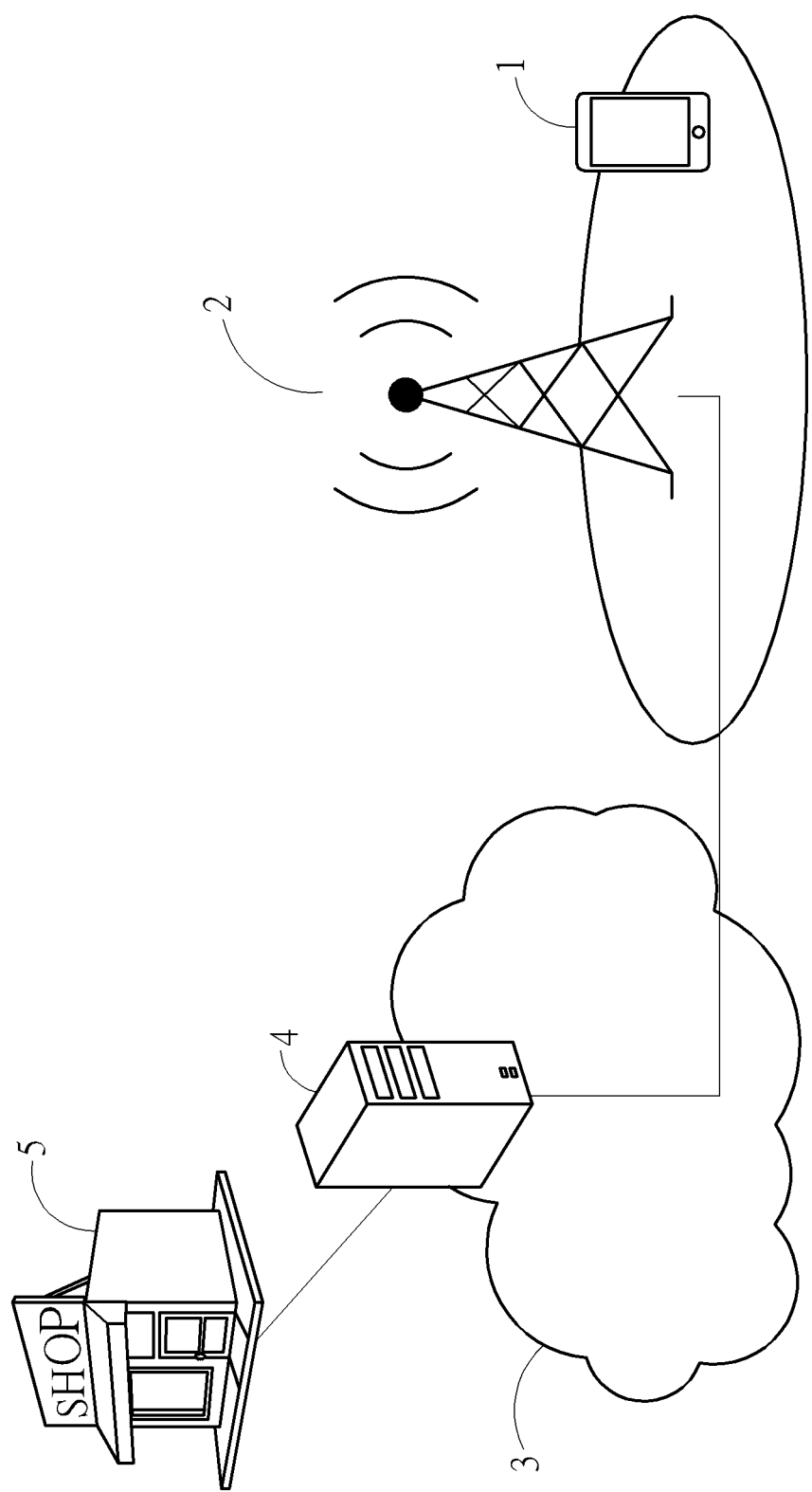
FIG. 1 is a schematic diagram of a wireless communication system according to an embodiment of the present disclosure.

Reference is made to FIG. 1, which is a schematic diagram of a wireless communication system according to an embodiment of the present disclosure. The wireless communication system includes the mobile device 1, access network 2, core network 3, serving gateway 4 and server 5. In a word, the present invention provides a message transmitted by cell broadcast of a regional base station or over the air, OTA, for the user to perform access point name, APN, control, so that the user could obtain regional service provided by the server through a service network corresponding to the APN after the APN setting. There are many types of services in specific areas. For example, a large shopping mall use the service network to bind the mobile application, APP, which provides real-time promotions, discount coupons, bidding products and real-time parking information in the mall. The large shopping mall or exhibition may be covered by multiple base stations, and thus the base stations within the coverage of the shopping malls or exhibition broadcast the same mall message. Therefore, the mobile device will ignore broadcast messages that are received repeatedly when the broadcast message received is the same (namely the same message identifier). The access network 2 is used for processing radio signals, supporting terminal radio protocols, and is connected with the mobile device 1 and the core network 3, which is used for performing mobile management, network authentication, and public network interface (e.g. Internet).

In an embodiment, the access network 2 and the core network 3 are formed a 5G network (e.g. a New Radio (NR) network), and the access network 2 and the core network 3 are Next Generation-Radio Access Network (NG-RAN) and Next Generation-Core Network (NG-CN).

The next-generation wireless access network may include one or more base stations such as the next generation NodeBs, gNBs, where each next-generation base station may support high frequency bands (e.g. Sub-6 GHz frequency band and mmWave frequency band), each next-generation base station may further include one or more signal transmission reception point, TRP, and each next-generation base station or signal TRP may be regarded as a 5G base station.

The next-generation core network includes multiple network entities. These network entities can be divided into network functions at the user equipment, UE, layer and network functions at service layer, where the network functions at the UE layer include registration management, signaling connection management, mobile management, access authentication and authorization, etc., while network functions at the service layer include session management, data path selection and management, and so on. Furthermore, the next generation core network may include other network functions, such as Network Function Repository (NFR) for assisting in searching and selecting the required network functions. Each network entity must register with the NRF and continuously update its status (e.g. activation/deactivation) when it is materialized, so that the NFR can record the currently available network entities.

Figure 2:
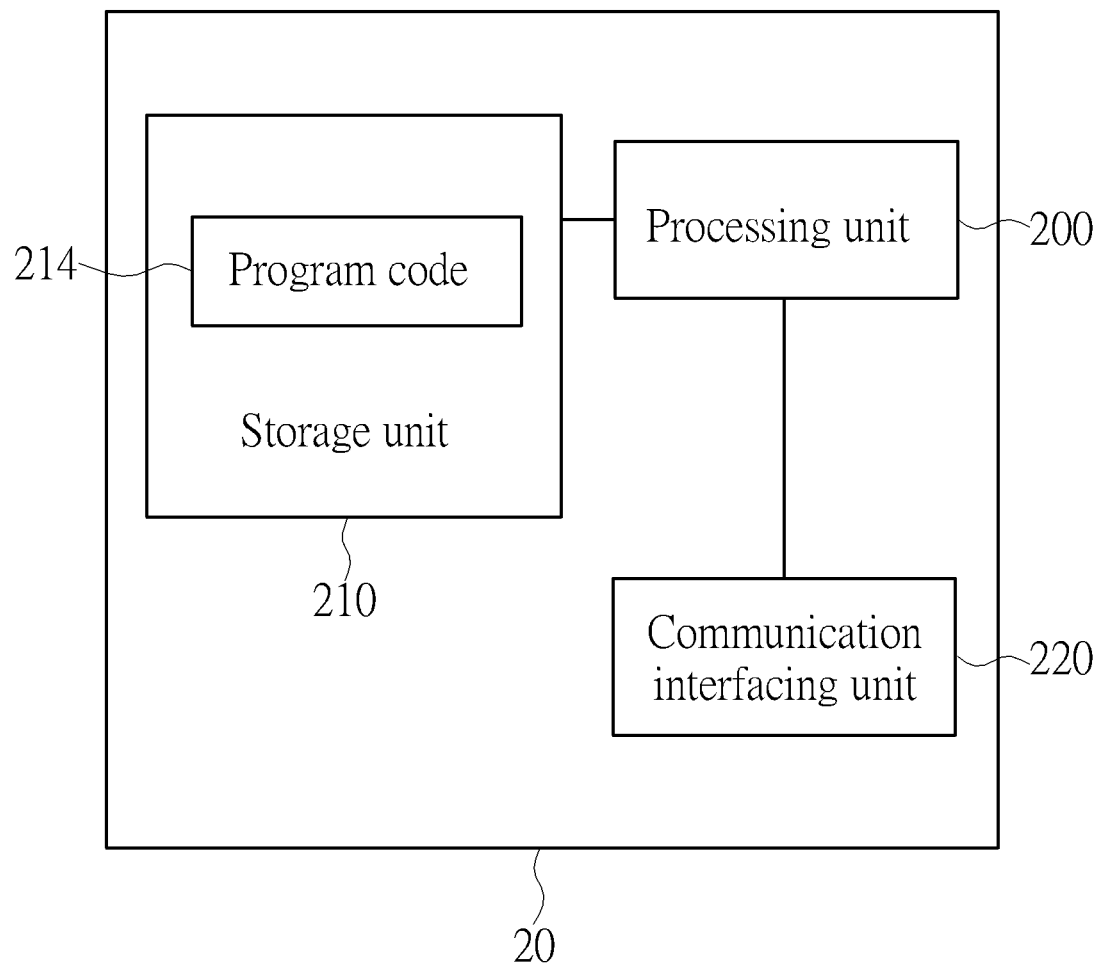
FIG. 2 is a schematic diagram of a communication device according to an embodiment of the present disclosure.

FIG. 2 is a schematic diagram of the communication device 20 according to one embodiment of the present disclosure. The communication device 20 may be the mobile device 1 or access network 2 (hereafter called base station) of FIG. 1, and includes a processing unit 200, such as a microprocessor or Application Specific Integrated Circuit (ASIC), a storage unit 210 and a communication interfacing unit 220. The storage unit 210 may be any data storage device that can store a program code 214, for access by the processing unit 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 could be a wireless transceiver for exchange signals with other communication devices such as base station or mobile device.

Figure 3:
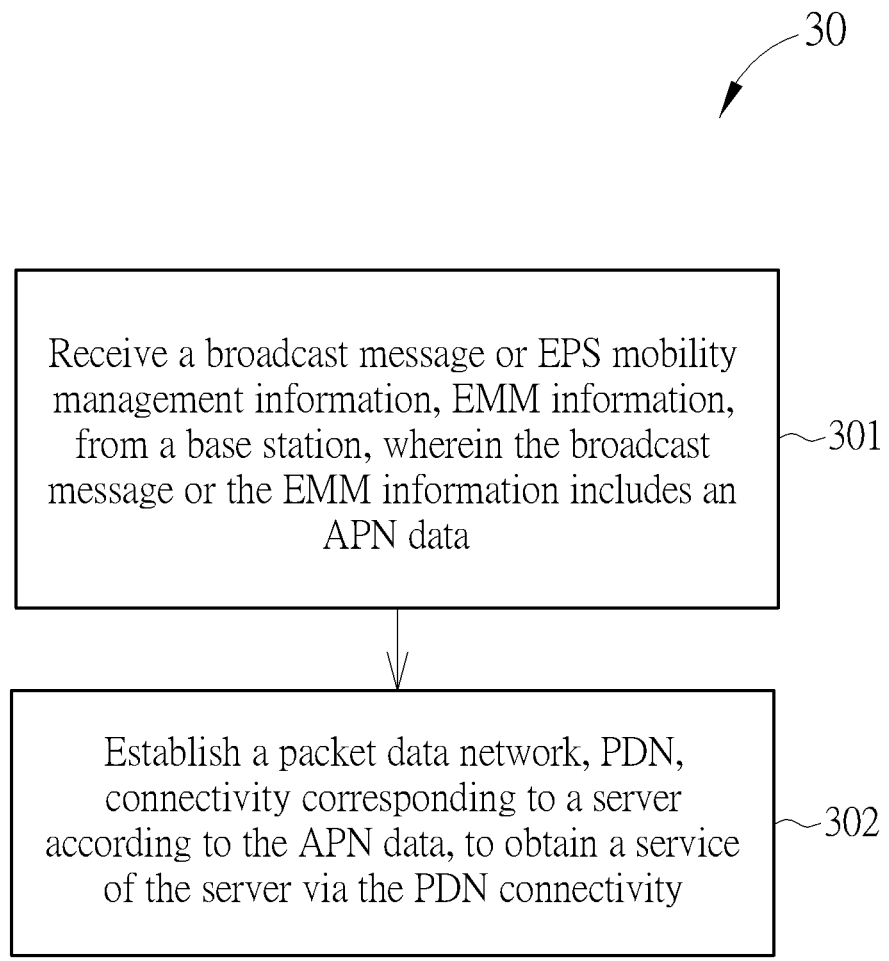
FIG. 3 is a flowchart of access point name setting according to an embodiment of the present disclosure.

Reference is made to FIG. 3, which is a flowchart of APN setting process 30. The APN setting process 30 could be utilized in the communication device 20, may be compiled into a program code 214, and may include the following steps:

Step 301: Receive a broadcast message or EPS mobility management information, EMM information, from a base station, wherein the broadcast message or the EMM information includes an APN data.

Step 302: Establish a packet data network, PDN, connectivity corresponding to a server according to the APN data, to obtain a service of the server via the PDN connectivity According to the APN setting process 30, the base station transmits the APN data for PDN connectivity establishment to the mobile device with broadcast message or EMM information. In an embodiment, the broadcast message includes link information (e.g. Uniform Resource Locator, URL) that triggers the APN setting operation. Therefore, the mobile device starts the APP for establishing the PDN connectivity when the mobile device receives the link information of the broadcast message. In detail, the APP is used for performing APN setting to establish a connection with the server, so as to obtain server services. In another embodiment, when the mobile device enters the service area of the base station, the mobile device receives the EMM information including the APN data from the base station, so the mobile device can automatically set the APN to establish a connection with the server and obtain server service.

In other embodiments, when the mobile device enters the service area of the base station, the mobile device transmits the tracking area update message to the base station, thereby triggering the base station to transmit the EMM information including the APN data to the mobile device.

Figure 4:
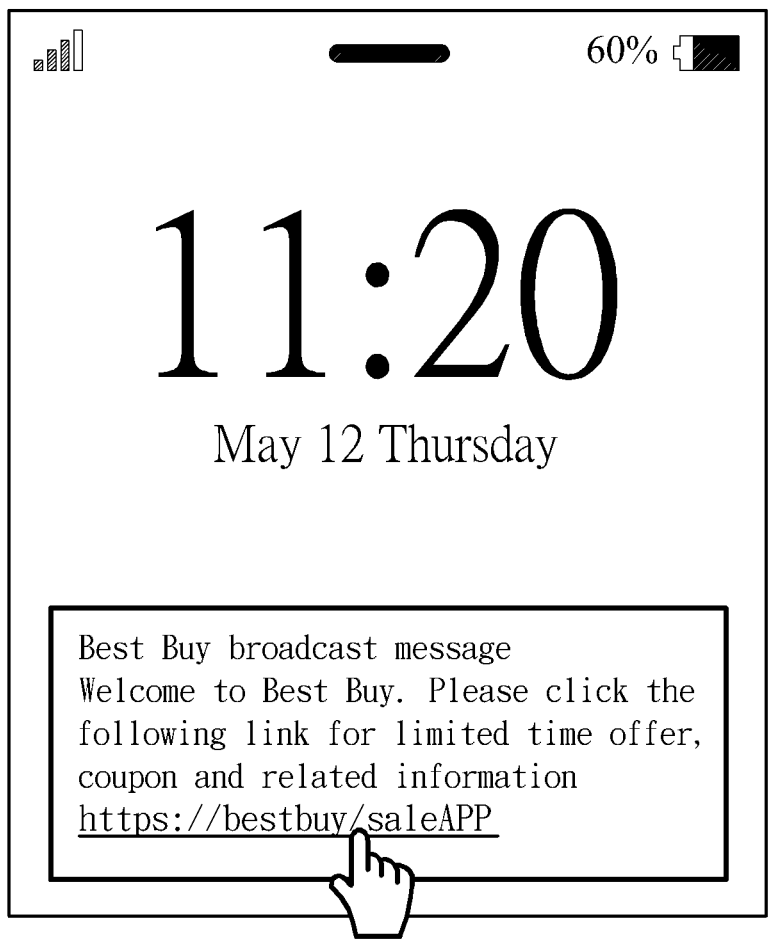
FIG. 4 is a schematic diagram of a broadcast message according to an embodiment of the present disclosure.

Please refer to FIG. 4, which is a schematic diagram of a broadcast message. When the communication device 20 (e.g. the mobile device 1 shown in FIG. 1) moves into an area of the base station of the shopping mall (e.g. the shopping mall may deploy multiple small base stations), the communication device 20 receives the broadcast message (or push message) from the shopping mall. If the user is willing to use the service provided by the shopping mall, as long as he/she clicks the link in the broadcast message, a specific service APP will be automatically launched for establishing a communication connection with the private APN, so that the user can obtain the shopping mall service through this APP.

Figure 5:
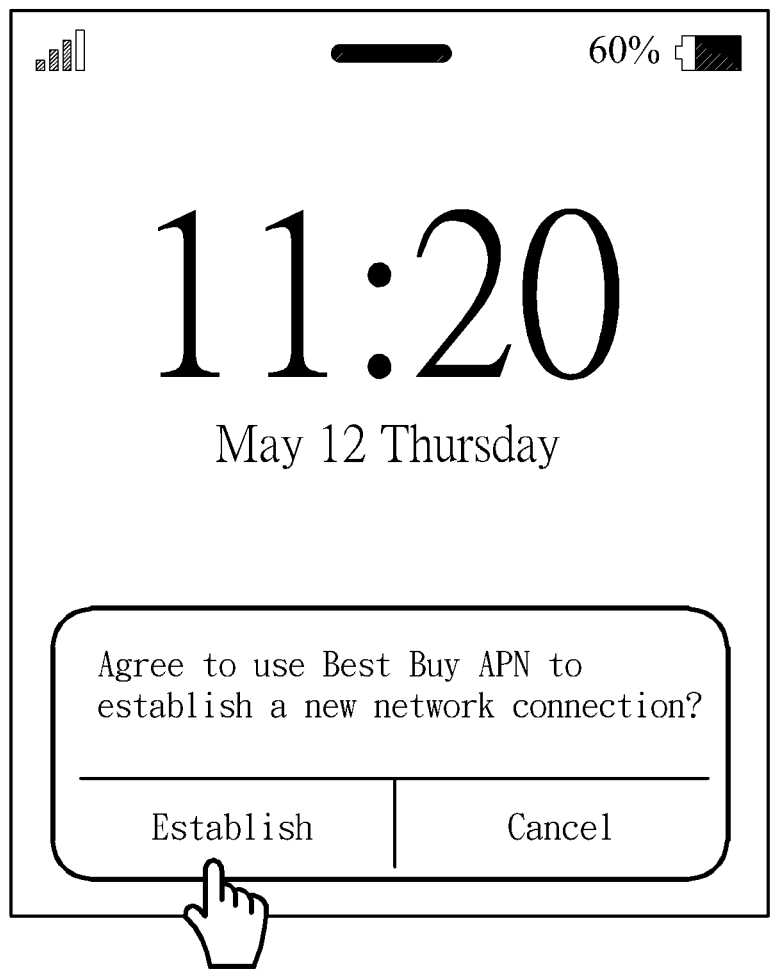
FIG. 5 is a schematic diagram of EMM information according to an embodiment of the present disclosure.

FIG. 5 is a schematic diagram of EMM information. The communication device 20 (such as the mobile device 1 of FIG. 1) receives the EMM information including the private APN (such as the electrical appliance store name Best Buy) from the base station. The communication device 20 notifies the user interface of the APN data, and the user interface displays a message to notify the user of the APN setting. When the user clicks the APP link in the message or clicks to establish a connection, the mobile device determines the connecting method for this APN according to the existing service.

In one embodiment, if the communication device 20 already has an existing network connection, the communication device 20 maintains the existing connection and establishes another private network connection with the private APN (e.g. Best Buy) provided by the base station through the packet data network gateway, P-GW (not shown) to) establish PDN connectivity. In another embodiment, when the communication device 20 has not yet established any network connection, the communication device 20 is able to use the free private APN provided by the base station to establish a dedicated network connection. After the network connection is successfully established, the user can start using the services in the exclusive APP, where only the base station within the scope of the shopping mall will allow the communication device 20 to establish a connection with the exclusive APN. On the other hand, if the communication device 20 leaves the coverage area of the shopping mall, that is, when the communication device 20 is not covered by the base station of the shopping mall, the communication device 20 releases or interrupts the network connection with the shopping mall. For example, the communication device 20 sends a PDN disconnect request to the base station. Accordingly, the base station sends a Deactivate EPS Bearer context request to the communication device 20.

In a word, the present invention provides two APN setting methods, namely the broadcast message and EMM information. According to the current 3GPP specification 24.301, the base station includes the full name, abbreviated name, and local time zone of the server in the EMM information. Note that, the present invention further includes the APN data in the EMM information. In other words, the conventional EMM information does not carry the APN data, so the present invention proposes the concept of adding the APN data into the EMM information. With such manner, the communication device 20 notifies the user of all the information such as the full name, abbreviated name, local time zone, and APN of the server when the communication device 20 receives the EMM information with the APN data. When the user interface obtains the APN data provided by the base station, a message is displayed to notify the user.

As can be seen, the present invention proposes a wireless communication system based on a cellular network (including a 5G mobile network). The base station broadcasts a message or sends EMM information with a private APN to manage the APN to achieve special requirements/services in a target area.

Take a scenario as an example. The present invention provides a free service platform APP for all consumers who enter a store or a specific area. This service platform contains discount information of the store, special events information of the store, or any information that the store wants consumers to know. Generally, after consumers enters the store, if they want to know the information about the store's activities, consumers may have to ask the service center or go to the official website to check. This requires consumers to use their mobile Internet traffic or free WIFI in the store. In contrast, the present invention utilizes the base station to broadcast messages or send EMM information, so that consumers' mobile phones can automatically establish a free network connection and download a service platform APP, and the store can instantly notify sale information to consumers.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention addresses to provide an APN setting method for establishing a private network connection and a related device. In detail, when a consumer enters the coverage (e.g. a store/conference) of a specific base station, the base station sends a broadcast message with private APN or EMM information with private APN to the consumer's mobile phone, and thus the mobile phone automatically completes the APN setting according to the private APN (i.e. automatically download and install the service platform APP to establish a private network connection and obtain regional services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of adaptively setting access point name, APN, for a regional base station of a wireless communication system, the method comprising:
   transmitting a broadcast message to a mobile device of the wireless communication system without receiving a message for requesting the broadcast message from the mobile device;
   wherein the broadcast message comprises an APN data for the mobile device to establish a packet data network, PDN, connectivity corresponding to a server according to the APN data, to obtain a service provided by the server via the PDN connectivity;
   wherein the broadcast message comprises link information for triggering an APN setting operation;
   wherein the link information comprises an Internet Protocol Address for downloading and installing a mobile application for setting an APN.

2. The method of claim 1, wherein the mobile application further provides the service of the server to the mobile device via the PDN connectivity.

3. A method of adaptively setting access point name, APN, for a mobile device of a wireless communication system, the method comprises:
   receiving a broadcast message from a regional base station of the wireless communication system without transmitting a message for requesting the broadcast message to the regional base station, wherein the broadcast message comprises an APN data and link information for triggering an APN setting operation, and the link information comprises an Internet Protocol Address for downloading and installing a mobile application for setting an APN; and
   establishing a packet data network, PDN, connectivity corresponding to a server according to the APN data, to obtain a service of the server via the PDN connectivity.

4. The method of claim 3, wherein the mobile application further provides the service of the server to the mobile device via the PDN connectivity.

5. A regional base station for adaptively setting access point name, APN, the regional base station comprising:
   a processing unit, for executing a program code; and
   a storage unit, coupled to the processing unit, for storing the program code,
   wherein the program code instructs the processing unit to perform the following steps:
      transmitting a broadcast message to a mobile device of the wireless communication system without receiving a message for requesting the broadcast message from the mobile device;
      wherein the broadcast message comprises an APN data for the mobile device to establish a packet data network, PDN, connectivity corresponding to a server according to the APN data, to obtain a service provided by the server via the PDN connectivity;
      wherein the broadcast message comprises link information for triggering an APN setting operation;
      wherein the link information comprises an Internet Protocol Address for downloading and installing a mobile application for setting an APN.

6. The regional base station of claim 5, wherein the mobile application further provides the service of the server to the mobile device via the PDN connectivity.

7. A mobile device for adaptively setting access point name,
APN, the mobile device comprising:
a processing unit, for executing a program code; and
a storage unit, coupled to the processing unit, for storing the program code, wherein the program code instructs the processing unit to perform the following steps:
receiving a broadcast message from a regional base station of the wireless communication system without transmitting a message for requesting the broadcast message to the regional base station, wherein the broadcast message comprises an APN data and link information for triggering an APN setting operation, and the link information comprises an Internet Protocol Address for downloading and installing a mobile application for setting an APN; and
establishing a packet data network, PDN, connectivity corresponding to a server according to the APN data, to obtain a service of the server via the PDN connectivity.

8. The mobile device of claim 7, wherein the regional base station is established between the mobile device and a core network, for serving the mobile device in an area; wherein the mobile device is directly served by the core network outside the area.

* * * * *